Feb. 6, 1951 P. E. FISCHER ET AL 2,540,612
MAGNETIC CRATE LOADING APPARATUS WITH
AUTOMATIC STOP AT SUCCESSIVE LEVELS
Filed July 17, 1945 7 Sheets-Sheet 5

INVENTORS
PAUL E. FISCHER
EDGAR ARDELL
BY
Pennie, Davis, Marvin & Edmonds
Their ATTORNEYS Feb. 6, 1951  P. E. FISCHER ET AL  2,540,612
MAGNETIC CRATE LOADING APPARATUS WITH
AUTOMATIC STOP AT SUCCESSIVE LEVELS
Filed July 17, 1945                                     7 Sheets-Sheet 6

INVENTORS
PAUL E. FISCHER
EDGAR ARDELL
BY
Pennie, Davis, Marvin & Edmonds,
Their ATTORNEYS Patented Feb. 6, 1951

2,540,612

UNITED STATES PATENT OFFICE 2,540,612

MAGNETIC CRATE LOADING APPARATUS WITH AUTOMATIC STOP AT SUCCESSIVE LEVELS

Paul E. Fischer, Portland, and Edgar Ardell, Middletown, Conn., assignors, by mesne assignments, to Hartford-Empire Company, Hartford, Conn., a corporation of Delaware Application July 17, 1945, Serial No. 605,539

6 Claims. (Cl. 226—14)

This invention relates to apparatus for handling cans and more particularly to apparatus for loading or filling process or retort crates with filled and closed cans, glass jars or other containers for food or other products.

In processing various food products such, for example, as canned vegetables, it is customary to fill and close the cans and then place them in a large metallic basket or crate which is placed in the cooking or other processing apparatus. Heretofore, in processing cans, it has been customary to dump the cans into the retort crate in a helter-skelter mass, such apparatus as has heretofore been proposed for arranging the cans in tiers in these crates being undesirable for one reason or another.

The primary object of the present invention is to provide an improved apparatus for placing cans, jars and the like in a retort crate in an orderly arrangement, particularly in a series of superposed tiers or layers.

In carrying out this invention the cans are collected on a suitable table on which they are arranged in a circular formation in upright position. The apparatus then magnetically lifts this formation of cans from the collecting table, carries them over the processing crate and then lowers them into the crate. Accordingly another object of the invention is to provide mechanism whereby successive lowering movements or excursions of the can-lifting head are stopped automatically at successively different heights in the crate, corresponding to the successive tiers or layers of cans.

The invention will be understood from an examination of the accompanying drawings which illustrate, by way of example, one embodiment thereof. In these drawings.

Referring now to the accompanying drawings, the apparatus is supported on a rigid stationary vertical mast 1, which is secured to a base frame structure comprising a pair of horizontal members 2 which terminate at each end in laterally projecting feet 3. This base structure has a sufficient spread to provide a stable support for the mast 1.

Carried on the upper end of mast 1 by means of a ball step bearing 4 is a horizontal crane arm 5 having at one end a vertically movable magnet lifting head 6, and at its opposite end an electric motor 7 belted by means of a belt 8 to drive a hoist mechanism 9 which has a hoist drum 10 on which is wound a hoist cable 11. The right-hand portion of cable 11 passes over a sheave 12 and is secured at 13 to the lower portion of a vertically sliding bar 14 to which magnet head 6 is permanently fixed at its lower end.

Bar 14, which is preferably a steel bar having an I-beam section, is arranged to slide between two pairs of fixed guide bars 15 and 16 respectively secured at the end of crane arm 5. Friction reducing flanged rollers 17 are provided at both the lower and upper ends of guide bars 15 and similar flanged rollers 18 are provided at both ends of guides 16, the upper rollers 18 turning on the same supporting shaft as sheave 12. On account of the uneven surfaces of bar 14 the opposite pairs of rollers 17 and 18 are biased toward one another by helical springs 17a and 18a.

Figure 1:
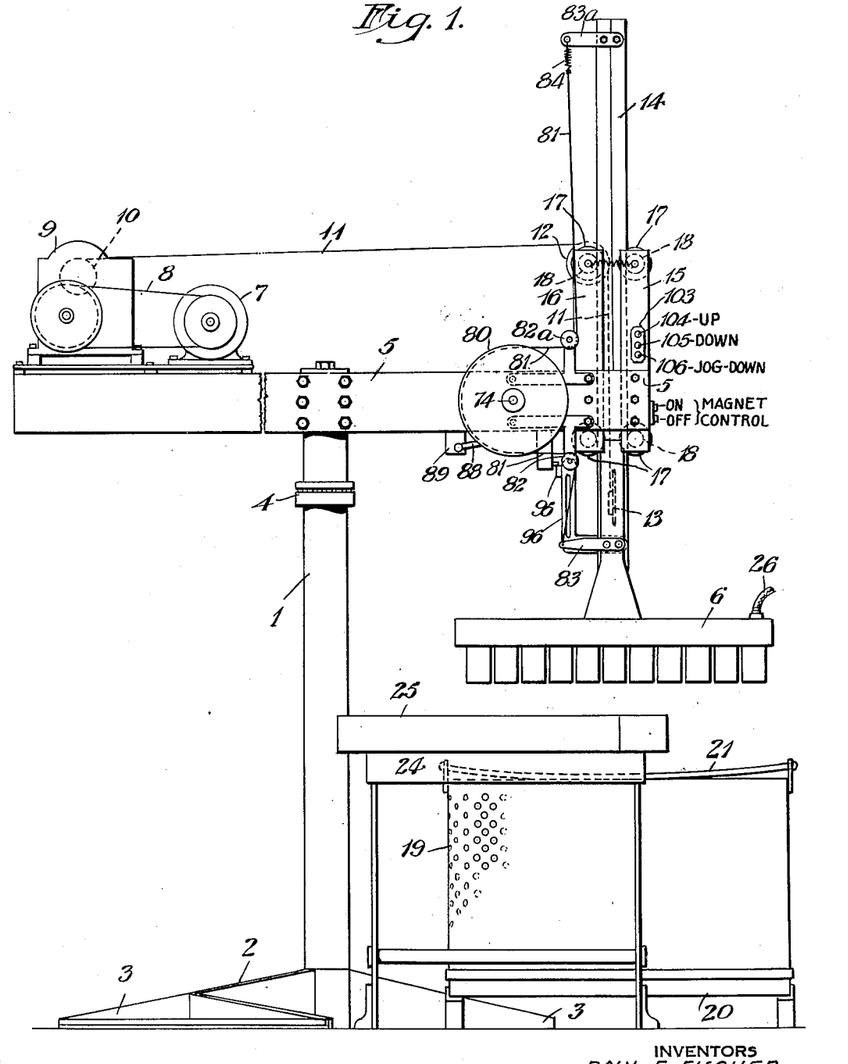
Fig. 1 is a view of the crate loading apparatus in side elevation.
Figure 2:
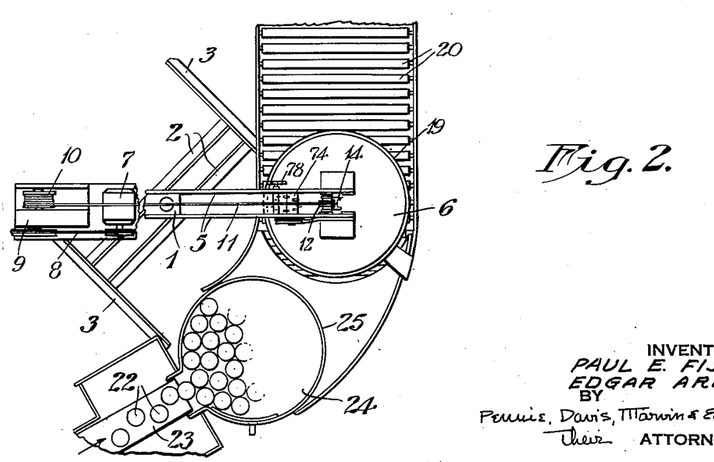
Fig. 2 is a plan view of the apparatus.

Referring to Figs. 1 and 2, the processing crate, indicated by numeral 19, into which the cans are to be placed in superposed tiers or layers, is supported on a roller conveyor 20, the bottom of the crate being only a few inches above the floor. Crate 19 is usually constructed of heavy gauge steel and its side walls are perforated in order to allow free passage of the cooking solution. The filled crate may be transported to the cooking retort on conveyor 20 and is provided with a bail 21 to facilitate the handling of the lled by means of an over-
, if desired.
essed, indicated by refer-
rought to the loading ap-
veyor 23 (Fig. 2) which
rcular collecting table 24
a circular rail 25 so that
dvanced by conveyor 23
lect on table 24 and form
to constitute a single tier
e. The elevation of col-
is somewhat higher than table 24 are picked up,
g the magnetic lifting
d lowering it, in a man-
on, and after the head
t is hoisted so that the
guide rail 25. Then lift-
ns suspended from it is
otation of crane arm 5
g head over the crate.
lowered by the control
ed to deposit the layer 6 is provided with a
ctromagnets so designed
he field of magnetic flux
. This is of importance
up a layer of cans pre-
ate during the last part
f the lifting head. It is
pparatus is used for the
, to unload a processing
r instead of loading it.
agnets, however, is also
intense magnetic flux
o as to pick up and se-
single tier or layer.
the magnets of lifting
f flexible conductors 26
devices shown in Fig. 15.
gh a pair of conductors
ple, from one phase of
dicated by numeral 28.
ected to one pair of the
omagnetic switch which
tion of its operating coil
ing to electromagnets 6
r pair of the contacts 29.
witch also has a pair of
enable the switch to be
off" momentarily closed
nd 33 respectively. The
32 closes a pair of con-
coil 30 of the electro-
circuit may be traced
onductors 27 through a
34, thence through con-
thence through conduc-
ly conductor 27.
onnected to one of the
part of the holding cir-
30 energized after push
his circuit may be traced
ce through conductor 38
contacts 39 of the off
and thence through a
r 35. The operation of
this holding circuit and
ic switch to open the cir-
head 6.
is illustrated a modified
head in which perma-
This lifting head comprises a circular supporting plate 41 to which the lower end of hoisting bar 14a is secured by means of two angle plates 42 which are bolted to the upper surface of circular plate 41 and to the sides of hoisting bar 14a. The lower portion of the web 43 of this I-section hoisting bar is provided with a central vertical opening or slot 44 for a purpose which will presently appear.

Figure 5:
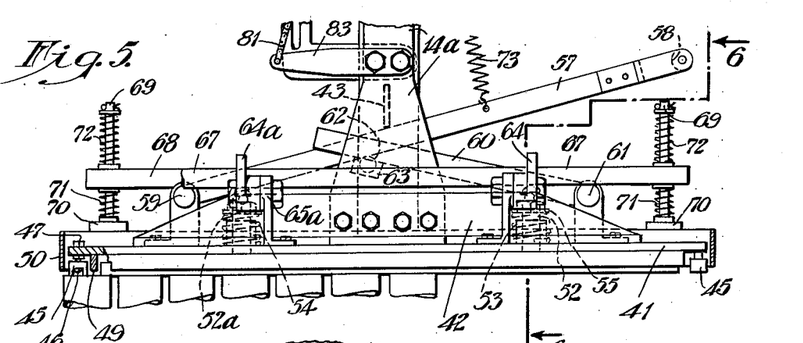
Fig. 5 is a view in side elevation of a modified form of lifting head, with parts broken away and shown in section.

Permanent magnets 45 are secured to the lower surface of supporting plate 41. These magnets are channel-shaped in cross section as shown in Fig. 5. Each is fixed to supporting plate 41 by means of a U-bolt 46, the central portion of which passes through the channel of the magnet from end to end, and the legs of which are inserted in holes punched in plate 41 and have nuts threaded on their upper ends as shown, for example, at 47. Associated with U-bolts 46 in supporting the magnets are flat springs 48 which are welded or riveted to the lower surface of plate 41.

This arrangement forms a yieldable mounting for each of the magnets, allowing them to compensate for the uneven upper surface of a layer of cans which may sometimes be caused by the bottoms of certain cans resting on the beads of adjacent cans. The details of this flexible mounting are set forth in the co-pending application of Paul E. Fischer, Serial No. 538,565, filed June 4, 1944, now Patent No. 2,466,693 and assigned to the same assignee as the present application. The arrangement of magnets 45 on the lower surface of plate 41 is such as to mount the greatest possible amount of permanent magnet surface on the supporting plate.

The cans are removed from this permanent magnet type of lifting head by means of a stripping mechanism which comprises a stripping member 49, preferably made of cast aluminum and arranged so as to have parts located between all of the numerous magnets 45, and a circular stripper 50 which extends around the periphery of plate 41. Stripping members 49 and 50 are arranged to be moved downwardly together to bring their lower edges below the lower surfaces of magnets 45 a sufficient distance to release the cans from the magnets.

Figure 6:
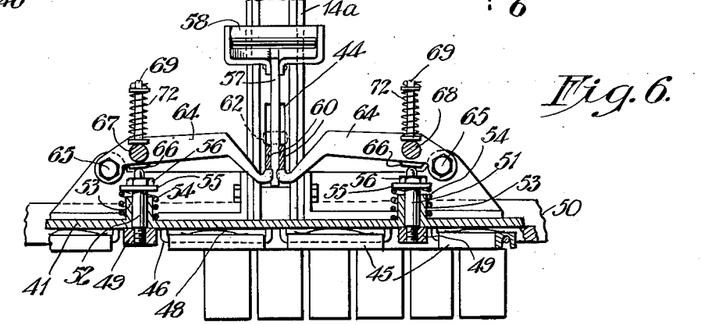
Fig. 6 is a partial vertical section taken on the broken line 6—6 of Fig. 5.

For this purpose stripping member 49 is supported by two pairs of vertical rods 51 and 52, the lower ends of which are threaded into stripper members 49 as shown in Fig. 6. Rods 51 and 52 pass upwardly through openings in plate 41 and also through collars 53 secured to the plate surrounding these openings. Surrounding collars 53 are helical springs 54 which bear against the under side of washers 55, these washers being held in place by nuts 56 threaded on the upper ends of rods 52. By this arrangement springs 54 normally hold stripping member 49 in its uppermost position as shown in Figs. 5 and 6.

For the purpose of actuating the stripping member to release cans from the magnets 45, an elongated lever 57 having an operating handle 58 at its right-hand end (Fig. 5) is pivoted at its lower and left-hand end at 59 to a pair of brackets secured to the top of plate 41. Lever 57 passes through the slot 44 in the web of hoisting bar 14a, previously referred to. Cooperating with lever 57 is a second lever 60 which is a double bar structure as may be seen in Fig. 6, with lever 57 passing between its two bars. Lever 60 is pivoted at its lower or right-hand end at 61 in brackets which are secured to plate 41 diametrically opposite pivot 59. In order to transmit motion from lever 57 to lever 60, lever 57 is adapted to engage the upper surface of a pin 62 which is fixed in apertures formed in ears 63 on the lower edges of the two bars forming lever 60, as shown in Fig. 5.

Lever 60, near its pivot 61 bears upon the inner ends of two oppositely extending stripper actuating levers 64 (Fig. 6). Levers 64 are pivoted at 65 in brackets adjacent the opposite edges of plate 41. Each lever 64 has a lug 66 on its lower edge adjacent pivot 65 which engages the upper end of one of the vertical rods 51, 52 which support stripper member 49.

Symmetrically arranged with respect to lever 64 on the opposite side of hoisting bar 14a there is a second pair of similar levers 64a, one of which may be seen in Fig. 5 and the other being directly in line with it. These levers are pivoted at 65a to brackets on plate 41 and they engage and actuate the second pair of vertical rods 51a, 52a similar to rods 51, 52. The inner ends of levers 64a are engaged by main stripping lever 57.

It will be understood from this construction that by depressing lever 57 the stripping grid 49 will be lowered or depressed so as to force the cans away from magnets 45.

In order to support stripping ring 50 two parallel horizontal rods 67 and 68 are supported in apertures in the two pairs of levers 64 and 64a. Rods 67 and 68 extend horizontally across and parallel with supporting plate 41 in vertical alignment with supporting rods 52 and 52a, and 51 and 51a, and hence have the same vertical movement as these rods. Ring stripping member 50 is supported on the outer ends of rods 67 and 68 by means of four slender vertical rods 69 which extend loosely through apertures in horizontal rods 67 and 68 and are threaded at their lower ends into bosses 70 formed on the upper edge of ring 50.

Stripper ring 50 is held at the desired elevation by helical springs 71 and 72 placed on rods 69 respectively below and above rods 67 and 68. With this arrangement, should the operation of lever 57 to strip cans from the lifting head bring stripper ring 50 into engagement with an obstruction, this would cause the compression of springs 71 and thus not interfere with the movement of main stripping member 49.

After an operation of the stripping mechanism by pulling down on handle 58, the parts are returned to their normal raised positions by springs 71 and 54 and by a helical spring 73, the lower end of which may be attached to lever 57, its upper end being secured to hoisting bar 14a.

The automatic control for lowering the successive layers of cans to successively different heights in the crate to correspond with the several tiers is illustrated in Figs. 3, 4, 7 and 8. This mechanism comprises a control shaft 74, the angular position of which corresponds always with the elevation of magnet lifting head 6, this shaft having secured thereon a plurality of control fingers, one for each tier of cans to be inserted in the crate. In this instance there are six of these control fingers F1–F6, inasmuch as the crate 19 holds six layers or tiers of cans. Fingers F1–F6 are each provided with a split hub 75 which may be clamped on control shaft 74 by means of a clamping screw 76. These fingers are set or adjusted on shaft 74 in spaced angular positions (Fig. 8) to correspond with the six layers or tiers of cans.

Figure 3:
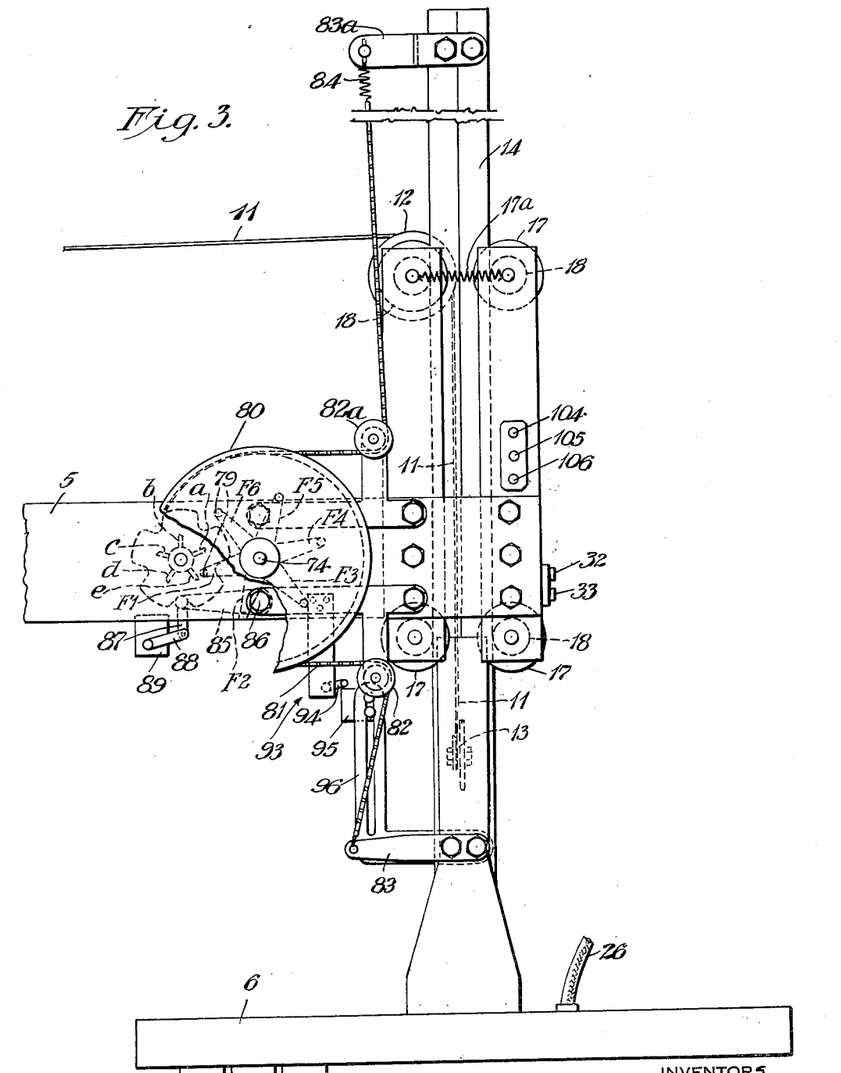
Fig. 3 is a view in side elevation of the lifting and lowering mechanism drawn to an enlarged scale.
Figures 4, 7, 8:
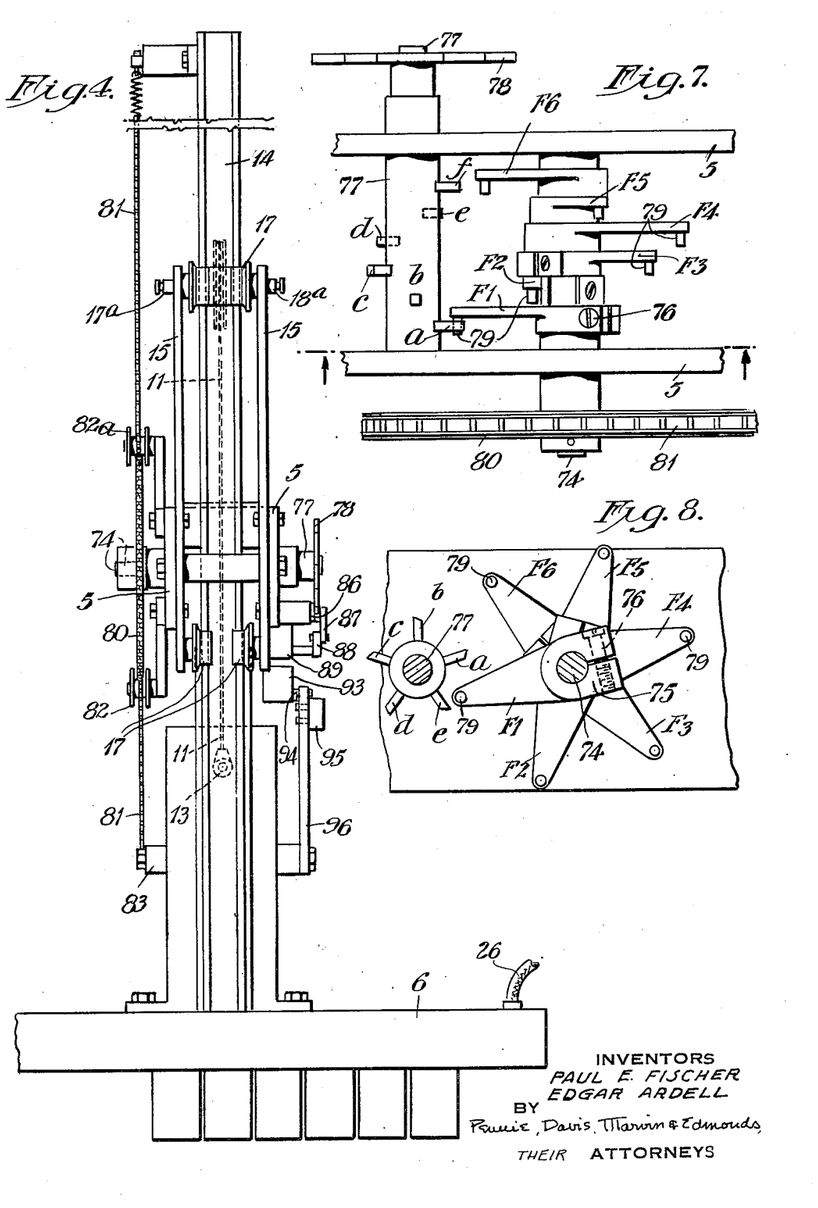
Fig. 4 is a view in end elevation of the apparatus shown in Fig. 3.
Fig. 7 is a plan view of the control mechanism shown in Fig. 8.
Fig. 8 is a side view of the mechanism shown in Fig. 7.

The automatic control mechanism also includes a ratchet and cam shaft 77 having projecting from its surface a series of six ratchet pins a to f inclusive, and fixed to the rear end of this shaft as viewed in Figs. 3, 7 and 8 there is a star wheel switch actuating cam 78. Pins a to f inclusive are spaced at equal angular positions apart as shown, for example, in Fig. 8 and pin f is in alignment with pin a as shown in Fig. 7. These six pins are permanently fixed in their positions on shaft 77 and are arranged to rotate in six spaced parallel planes at right angles to shafts 77 and 74. Control fingers F1–F6 are each provided with lugs 79 to engage and operate the respective pins a to f inclusive in a manner to be described, these control fingers being mounted adjacent one another on control shaft 74 with their respective lugs 79 rotating in the corresponding planes just referred to of pins a to f inclusive. Shafts 74 and 77 rotate in bearing openings provided in the two spaced steel plates which constitute crane arm 5.

For the purpose of rotating shaft 74 in accordance with the up and down movement of magnet lifting head 6 and hoisting bar 14, a large sprocket 80 is fixed upon the front end of shaft 74. Trained around this sprocket is a chain 81, the lower portion of which passes around a guide roller 82 mounted on a bracket secured to arm 5 adjacent bar 14, and the lower end of the chain is attached to a bracket 83 mounted near the lower end of bar 14 adjacent magnet head 6.

The upper portion of chain 81 passes around a second guide roller 82a mounted vertically above guide roller 82 and the upper end of the chain is attached to a second bracket 83a mounted at the upper end of bar 14. A stiff coil spring 84 is inserted between the upper end of chain 81 and bracket 83a to maintain the chain taut under all conditions. It will be understood that as bar 14 and magnet head 6 are raised and lowered by hoisting cable 11, sprocket 80 will be correspondingly rotated so that the angular position of sprocket 80, shaft 74, and control fingers F1–F6 will vary according to the vertical movement of the lifting head.

Figure 15:
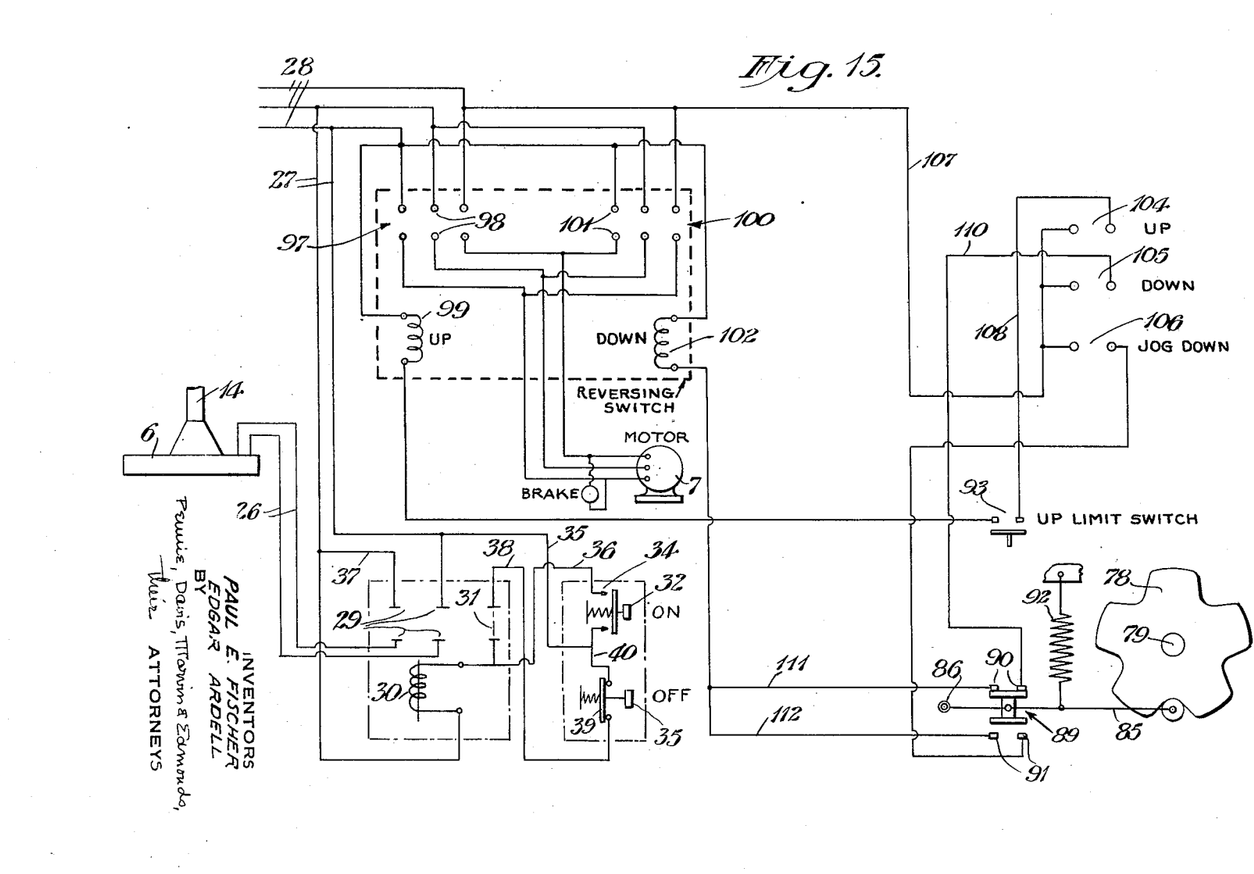
Fig. 15 is a diagram of electrical connections.

Star wheel cam 78 actuates a lever 85 pivotally mounted at 86 on crane arm 5 and provided at one end with the usual roller for engaging the edge of the cam. Lever 86 is operatively connected, as for example, by a short link 87, to the arm 88 of a switch 89 having two pairs of contacts 90 and 91 (Fig. 15).

Cam 78 has five lobes separated by five recesses. One of these lobes and recesses corresponds to the two ratchet pins a and f, which are in alignment with each other. The remaining lobes and recesses correspond respectively with pins b, c, d and e. Arm 85 is biased towards cam 88 by means of a helical spring 92 shown in Fig. 15 but not visible in the other figures. Switch 89 and contacts 90 and 91 control the automatic stopping of magnet head 6 on the lowering movement of the magnet head and hoisting bar 14.

The upward movement of the lifting head 6 and hoisting bar 14 is stopped by means of a limit switch 93 (Fig. 3), having an actuating arm 94 which is engaged by a block 95 adjustably secured in a slotted vertical bracket 96 attached to the lower end of the hoisting bar 14 adjacent bracket 83.

Figures 11, 12, 13, 14, 14A:
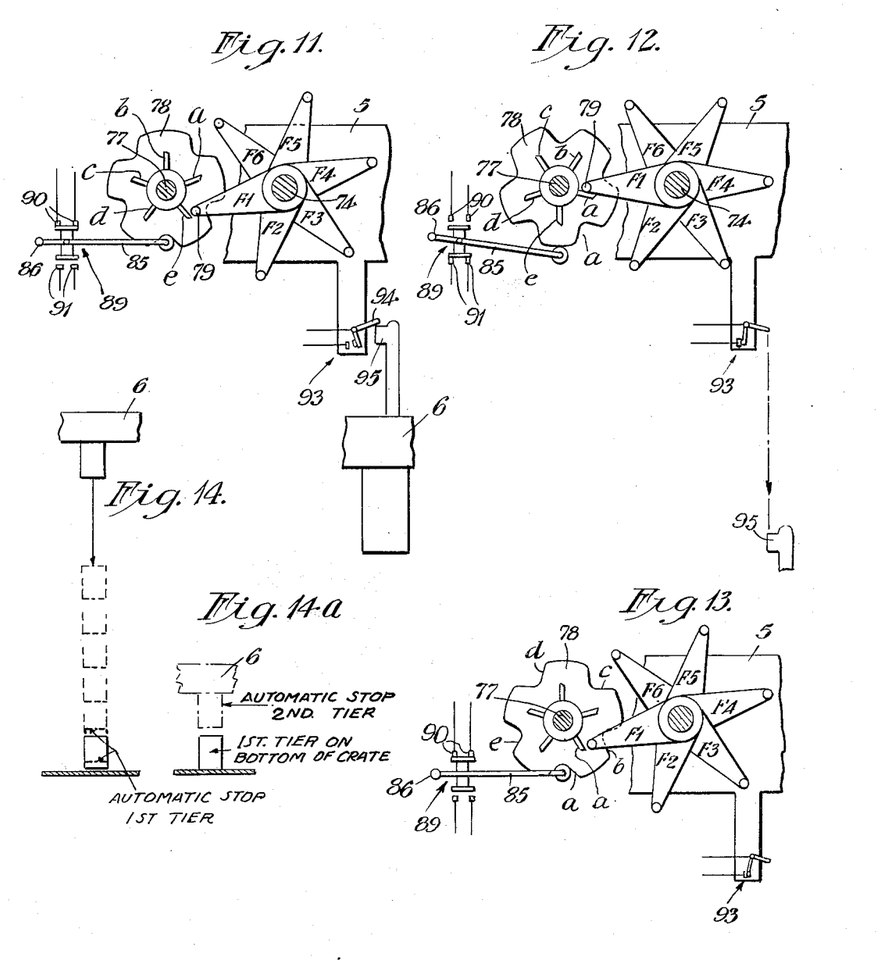
Figs. 11 to 13 inclusive are diagrammatic views of the control mechanism showing its operation in lowering the lifting head to deposit the first or lowermost tier of cans.
Figs. 14 and 14a are diagrammatic views showing the stopping positions of the tiers.

Referring now to the connection diagrams (Fig. 15), current is supplied to hoisting motor 7 from supply conductors 28 through either of two electromagnetically operated switches, namely an "up" switch 97 having contacts 98 which are closed when operating coil 99 is energized, and a "down" switch 100 having contacts 101 which are closed when its operating coil 102 is f operating coils 99 means of a push button the outer end of crane ent to the operator.
h buttons, namely an " button 105, and a hen "up" button 104 a circuit from a conm one of the supply or 108 leading to the witch 93, and thence operating coil 99, the is connected to another rs 28. Hence motor et head 6 and hoistitton 104 is held de- 93 is opened by the its operating lever ton 105 a circuit is from conductor 107 switch 105, thence contacts 90 of cam through conductors 1 102 of the "down" site terminal of this pply conductor 28 to erate to lower hoistd 6 as long as the eld depressed, or unre opened by the roe end of lever 85 out nent with one of the s 90, stopping motor ch prepares a second ting coil 102 of the This circuit is from ductor 113, contacts he contacts of "jog e to conductor 107.

aratus in loading the ans in crate 19 will g that each of the ve has been adjusted ion on shaft 74 to ayers 1 to 6 inclusive between the top of a can tier when it head at its highest and 14.

ung into the position 2) and "down" butdepressed manually ng head engages the the operator release such contact takes depresses "up" butis hoisted until limit the cans will have o clear the top of he opposite direction cally above crate 19 0, as shown in Figs. at this upper limit F1 and ratchet pin in Figs. 3, 8 and 11. own" button 105 and to lower the tier of ting head 6 moves rotated by chain 81 he counterclockwise of lifting head 6

Figures 9, 10:
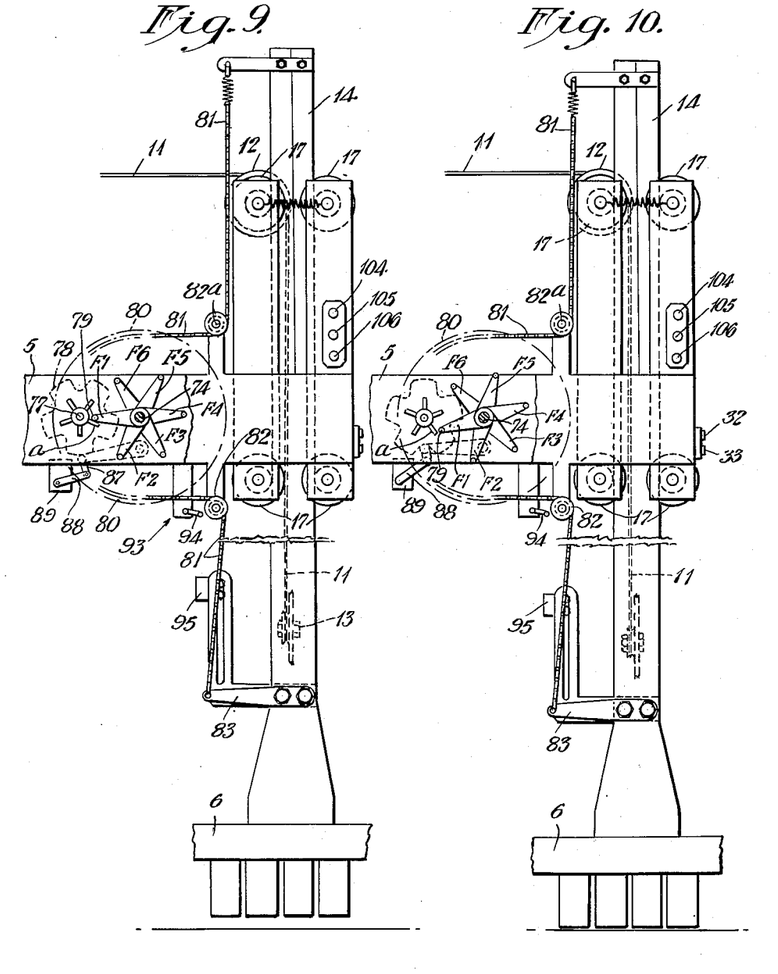
Fig. 9 is a view similar to Fig. 3 with the parts in a slightly different position and with certain parts broken away.
Fig. 10 is a view similar to Fig. 9 with the parts in a still different position.

8 continues until the tier of cans held by it is near the bottom of the crate but the bottoms of the cans are still out of contact with it. This position is shown in Fig. 9, from which it will be seen that the bottoms of the cans may be from one to two inches from the bottom of the crate. When this point is reached finger F1 will have rotated almost but not quite one complete revolution and, since it rotates in the same plane as ratchet finger $a$, it will have engaged this finger and rotated it slightly, moving it from the position shown in Fig. 11 to that shown in Fig. 12.

This slight rotation of shaft 77 by engagement of finger F1 with pin $a$ will cause the opening of switch contacts 90 (stopping hoist motor 7) and the closing of contacts 91 as previously described, preparing the circuit of operating coil 102 of "down" switch 100 for energization when "jog down" button 106 is depressed.

By stopping the cans a predetermined distance above the surface at which they are to rest, whether it is the bottom of the crate or the top of a preceding tier, motor 7 can be operated to lower the cans at maximum speed without fear of damaging them by collision with such surface. The cans are then lowered gently to the position shown in Fig. 10 where the bottoms are just out of contact with the bottom of the crate or the top of a preceding tier, whichever it may be.

This second lowering movement of the tier is accomplished by depressing "jog down" button 106 and holding it depressed while motor 7 lowers magnet lifting head 6 sufficiently to cause cam 78 to rotate just enough to permit the end of lever 85 to enter recess $a$ of cam 78. This opens contacts 91, thereby stopping motor 7 again, and recloses contacts 90 so as to prepare for the energizing of the circuit of operating coil 102 through the contacts of "down" push button switch 105.

During this second lowering movement motor 7 never reaches full speed but merely operates enough to produce a down "jogging" movement of the can tier, say from one to one and threefourths inches, so as to leave the bottoms of the cans barely separated from the surface on which they are to rest. The off push button switch 33 is then depressed, thereby de-energizing the circuit of the electromagnets within magnet head 6 and allowing the cans of the tier to drop into their final position.

The operator thereupon depresses the "up" button 104 and holds it depressed until the empty lifting head 6 has been hoisted to its top position where it will again be arrested by the opening of limit switch 93. The operator then swings crane arm 5 to pick up another tier of cans from the collecting table 24 and then repeats the operation just described in lowering this second tier into the crate. With the lifting head 6 in its top position fingers F1–F6 will be in the same angular positions as before.

However, ratchet pin $a$ cannot again be actuated by finger F1 as it is still in the position to which it has been moved by this finger during the insertion of the first tier of cans. Ratchet pin $b$, however, is now in the same angular position that pin $a$ formerly occupied and will be engaged by the lug of finger F2 when the second tier has been lowered to the stop position where the bottoms of the cans are about two inches above the tops of the first tier of cans already inserted (Fig. 14a). The engagement of finger F2 with pin $b$ will cause a small angular rotation of cam 78, thereby forcing the end of lever 85 out of the next recess and onto the next lobe, thus operating switch 89 precisely as before and preparing the circuit of "jog down" button 106.

The insertion of the successive tiers is carried on in the same way, the stopping of the last or highest tier being accomplished by finger F6 which engages ratchet pin f, which is in alignment with the first ratchet pin a. Thus the insertion of the six layers of cans will cause shaft 77 to rotate somewhat more than one complete revolution. Consequently before the loading of a second crate is commenced, it is necessary to turn shaft 77 by hand until pin a is reset in its initial angular position as shown in Figs. 3, 8 and 11. This may be accomplished by grasping cam 78 with the fingers and turning it backwards one notch, that is, until the end of lever 84 rests in the preceding recess. When the crate 19 is to receive five layers instead of six, this resetting operation is unnecessary.

It will be understood that the automatic control mechanism can be adjusted for the handling of different numbers of tiers by adjusting the angular positions of the fingers F1–F6 inclusive. Also, by changing the angular positions of these fingers the apparatus can be adjusted to handle cans of different heights, since the angular displacement between adjacent fingers corresponds with the heights of the can tiers. Furthermore, by changing the angular position of finger F1 the clearance between the bottoms of the cans when the lifting head is at the top of its movement, and the top of crate 19 can be adjusted. Thus, when handling short cans block 95 which actuates the "up" limit switch 93 can be adjusted on its supporting bracket 96 so that the upward travel of lifting head 6 will not have to be as great as when handling tall cans, and finger F1 can be adjusted accordingly to correspond with the changed clearance distance.

Throughout this specification and in the claims it will be understood that the term "cans" includes not only metallic cans, but also jars or other containers of non-magnetic material having tops constructed, at least in part, of magnetizable material.

It will be understood that numerous changes in the construction and arrangement of the apparatus can be made without departing from the spirit and scope of the invention as set forth in the appended claims.

We claim:

1. In a crate loading apparatus, a lifting head constructed and arranged to lift a group of articles comprising a tier to be placed in an open top crate, means for supporting said lifting head for vertical movement into said crate through the top thereof, power operated means for lowering said lifting head, and a control device for said power operated means manually actuated to start the lowering of said head, said control device being automatically actuated to stop said head a predetermined distance above the final position of said tier in the crate, said control device also being manually actuable to cause the further lowering of said head and automatically actuated to stop said further movement.

2. In apparatus for loading open top crates with superposed tiers of articles, a lifting head constructed and arranged to lift a group of articles comprising a tier, means for supporting said lifting head for vertical movement into said crate through the top thereof to introduce said tier in the crate, power operated means for lowering said lifting head, and a control device for said power operated means, said device operating automatically to stop successive tier-introducing movements of said head at successively increased heights above the bottom of said crate thus automatically to superpose the respective tiers therein, and means for releasing said articles from the lifting head.

3. In apparatus for loading open top crates with superposed tiers of articles, a lifting head constructed and arranged to lift a group of articles comprising a tier, means for supporting said lifting head for vertical movement into said crate through the top thereof to introduce said tier in the crate, power operated means for lowering said lifting head, and a control device for said power operated means, said device operating automatically to stop successive tier-introducing movements of said head at successively increased heights above the bottom of said crate, said control device including mechanism for further lowering said head at the end of each of said successive tier-introducing movements to a predetermined elevation above the final tier position in the crate.

4. In apparatus for loading open top crates with superposed tiers of articles, a lifting head adapted to lift a group of articles comprising a tier, means for supporting said lifting head for vertical movement into said crate through the top thereof to place said tier in the crate, means including an electric motor for lowering said lifting head, and means operated automatically to stop successive lowering movements of said head at successively increased heights above the bottom of said crate comprising a switch to control the circuit of said motor, a star wheel cam, a lever actuated thereby to open said switch, and ratchet means operated by the movement of said lifting head to turn said cam one step at each lowering movement of said head.

5. In apparatus for loading open top crates with superposed tiers of articles, a lifting head adapted to lift a group of articles comprising a tier, means for supporting said lifting head for vertical movement into said crate through the top thereof to place said tier in the crate, means including an electric motor for lowering said lifting head, and means operated automatically to stop successive lowering movements of said head at successively increased heights above the bottom of said crate comprising a switch in the circuit of said motor, a star wheel cam operatively associated with said switch to open the same and stop the motor a plurality of times during each revolution of said cam, a cam shaft for said cam, a plurality of ratchet pins projecting from said shaft and spaced both laterally and angularly thereon, a control shaft disposed parallel with and in proximity to said cam shaft, a plurality of control fingers secured to said control shaft to cooperate individually and respectively with said ratchet pins, and means for rotating said control shaft in timed relation to the vertical movement of said lifting head to cause one of said control fingers to engage a ratchet pin and rotate said cam shaft one step for each lowering movement of said lifting head.

6. In apparatus for loading open top crates with superposed tiers of articles, a lifting head adapted to lift a group of articles comprising a tier, means for supporting said lifting head for vertical movement into said crate through the top thereof to place said tier in the crate, means including an electric motor for lowering said

REFERENCES CITED

The following references are of record in the file of this patent:

UNITED STATES PATENTS

| Number | Name | Date |
|---|---|---|
| 1,443,157 | Wild | Jan. 23, 1923 |
| 1,513,436 | Volz | Oct. 28, 1924 |
| 1,612,444 | Kimball et al. | Dec. 28, 1926 |
| 1,793,595 | Douglass | Feb. 14, 1931 |
| 2,206,279 | Ferguson | July 2, 1940 |
| 2,220,561 | Ward | Nov. 5, 1940 |
| 2,253,283 | Minaker | Aug. 19, 1941 |
| 2,384,179 | Knies | Sept. 4, 1945 |